Jan. 16, 1934.  J. F. KOCA ET AL  1,943,828

CHECK WRITER

Filed Feb. 3, 1928   9 Sheets-Sheet 1

Jan. 16, 1934.    J. F. KOCA ET AL    1,943,828
CHECK WRITER
Filed Feb. 3, 1928    9 Sheets-Sheet 5

Jan. 16, 1934.  J. F. KOCA ET AL  1,943,828
CHECK WRITER
Filed Feb. 3, 1928  9 Sheets-Sheet 9

Inventor:
James F. Koca
Otto A. Hokanson
By Nissen & Crane
Attys

Patented Jan. 16, 1934

1,943,828

UNITED STATES PATENT OFFICE 1,943,828

CHECK WRITER

James F. Koca and Otto A. Hakanson, Woodstock, Ill.

Application February 3, 1928. Serial No. 251,478

39 Claims. (Cl. 101—19)

This invention relates to a check writer and has for an object of the invention the provision of a check writing machine wherein the type on a plurality of members representing different decimal orders, is positioned for printing by a type-selecting means that arrests the motion of the slides connected to the members carrying the type after the slides have moved distances corresponding to the type to be printed;

Another object is to associate the slides in a novel manner with a stop carriage movable by depressing keys to position stops limiting the motion of the slides;

Another object is to automatically position a type plate adjacent the highest decimal order printed to prevent raising of the printed check;

Another object is to provide an inking mechanism that will ink only the type desired to be printed;

Another object is to provide a support for the platen which, during the forward motion of the platen, will press a corrugated bar against the check;

Another object is to associate the actuating mechanism with the platen, inking mechanism and type plate in a manner to cause a proper sequence of operation of these parts;

Another object is to provide a means permitting reversal of the mechanism in case of error to reposition the stop carriage before certain non-reversing means becomes effective;

Another object is to provide a convenient repeating means in connection with the carriage returning means.

Key board

Figure 1:
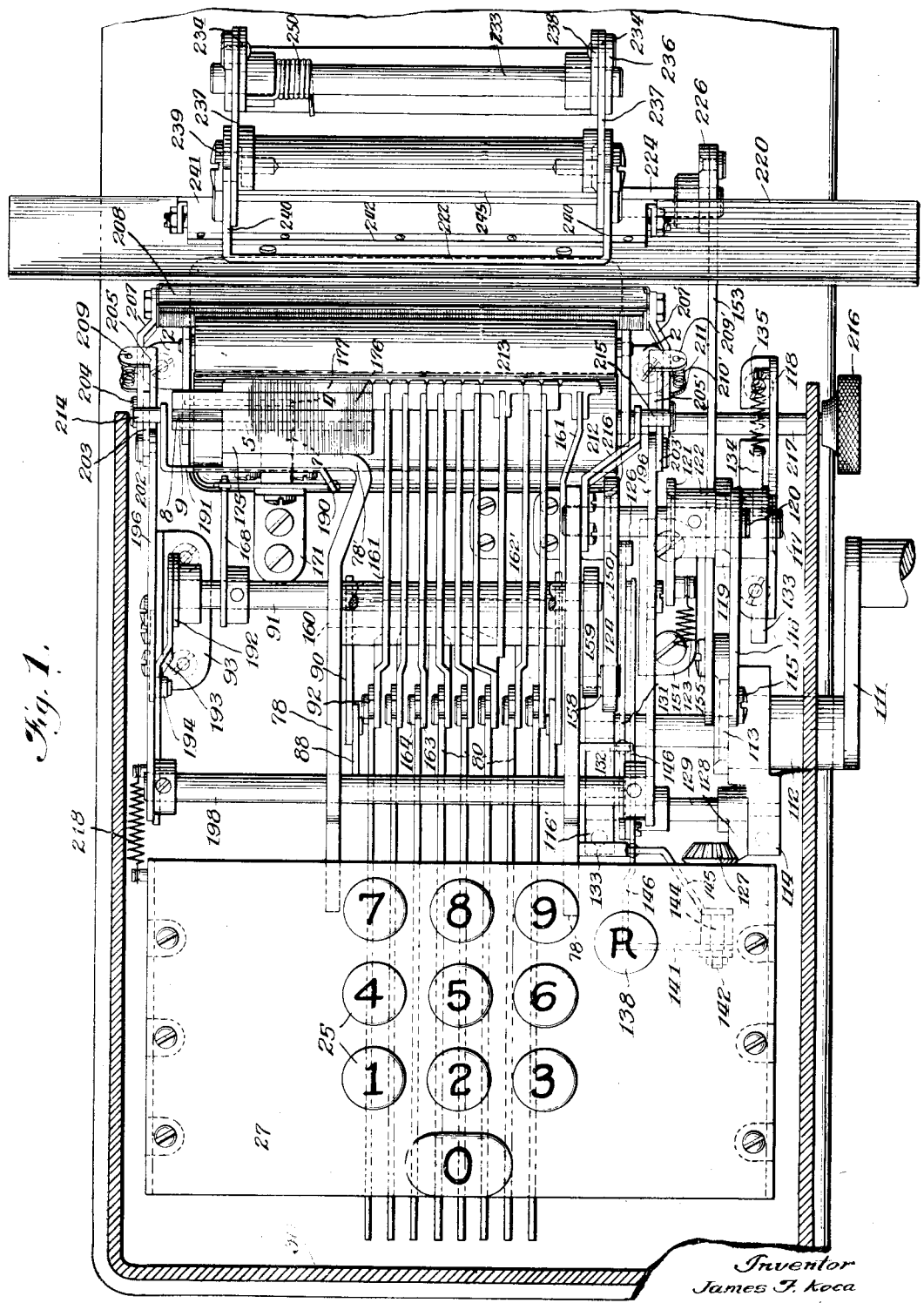
Figure 1 is a plan view.
Figure 2:
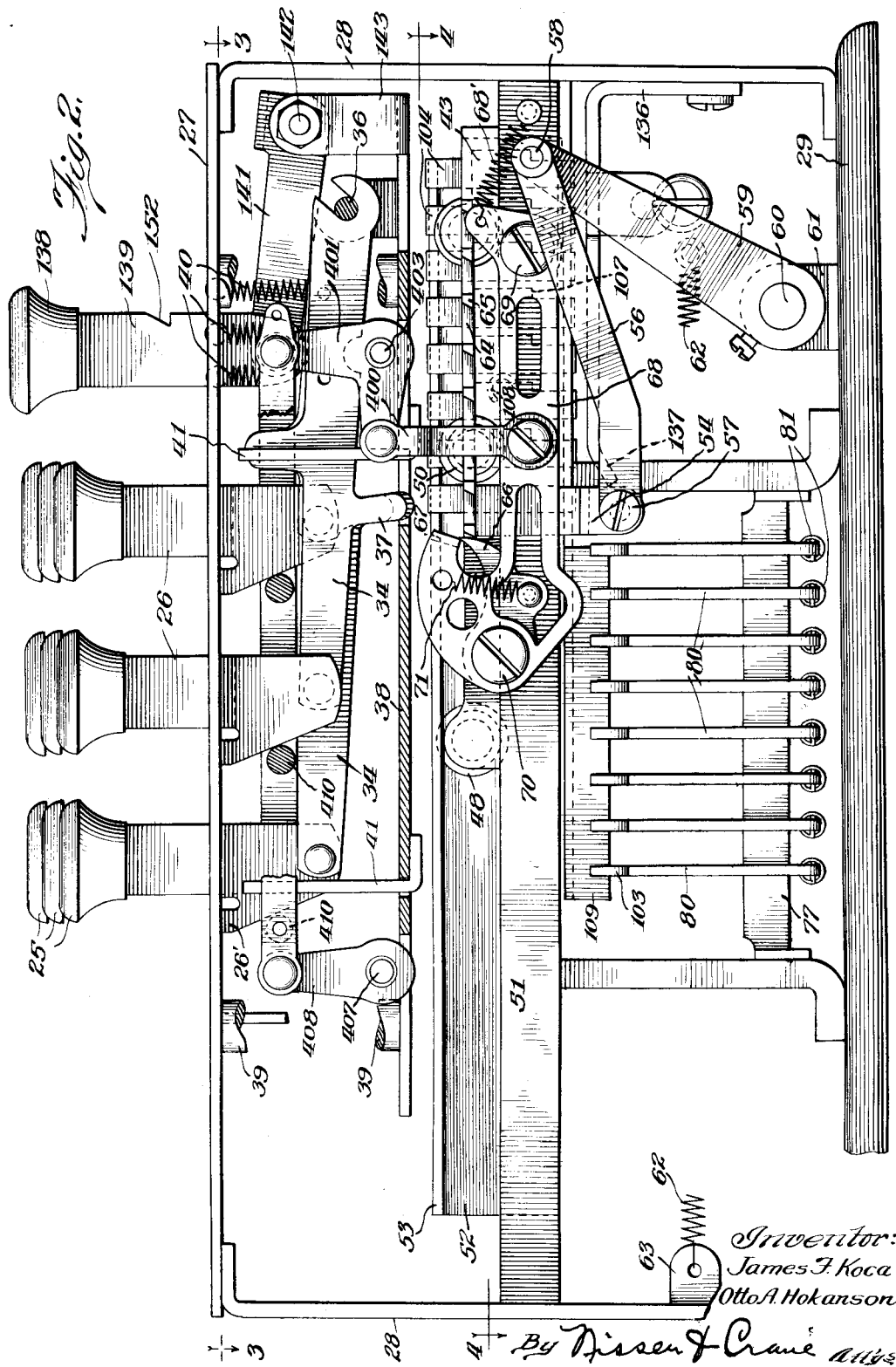
Fig. 2 is a front elevation with the keys removed, showing the operating mechanism for the stop carriage.
Figure 3:
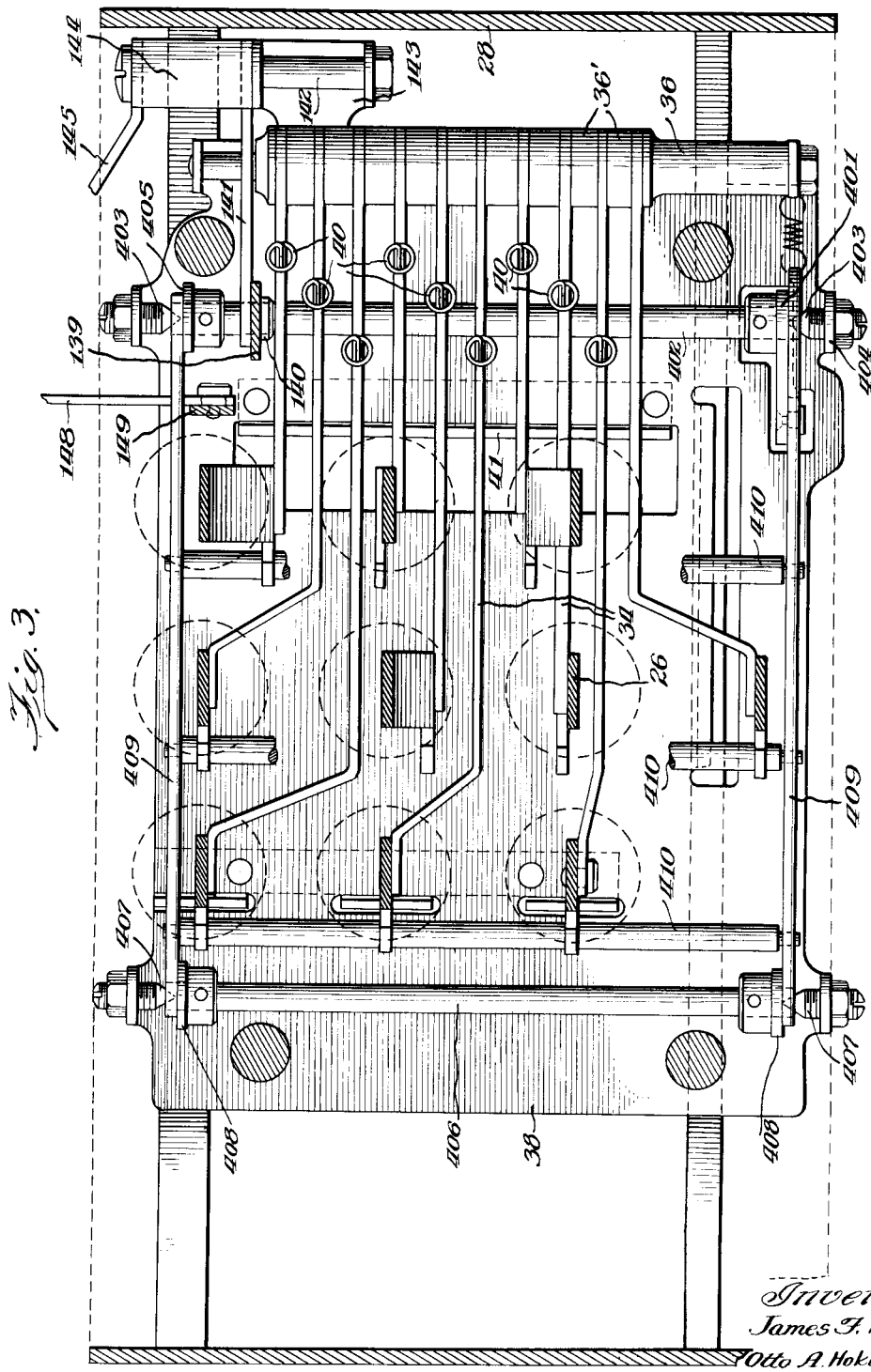
Fig. 3 is a section taken substantially on line 3—3 of Fig. 2.

The type selecting means may be either of the key or dial type and is arranged to operate means for limiting the movement of the type carrying means. As shown in Fig. 1, the number keys 25 are arranged in three rows of three each and numbered from zero to nine. The keys 25 have stems 26 which slide through slots in a horizontal frame plate 27 supported on side plates 28. An outer casing 30 may be provided which carries a cover plate 31 through which the key stems 26 project. Below the plate 27, the shanks 26 are connected to arms 34, all of which extend to the right of the key board, as shown in Figs. 2 and 3, and are pivoted on a cross rod 36 and are spaced apart by collars 36'. Projecting downwardly from each of the arms 34 is a finger 37, the fingers being arranged to extend through a plate 38 connected to the plate 27 by spacers 39. Attached to each of the arms 34 is a spring 40 secured to the plate 27 to yieldingly support the corresponding key in its upper position. As shown in Fig. 3, the springs 40 are spaced different distances from the rod 36, proportional to the different lengths of the arms 34 so that the keys will all have the same resistance to downward movement. The arms 34 are guided by slotted guides 41 projecting upwardly from the plate 38.

Stop carriage and slides

Figure 4:
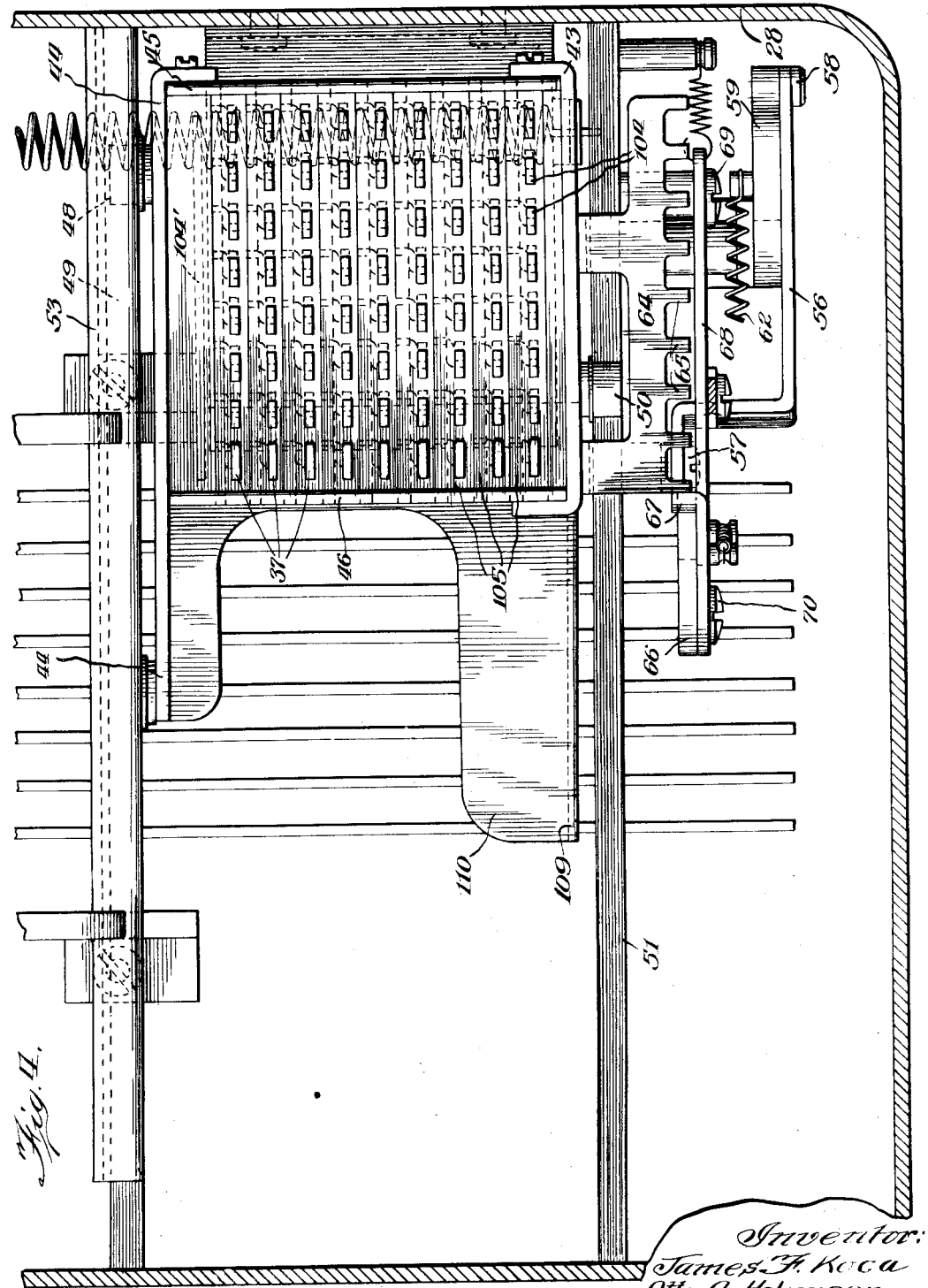
Fig. 4 is a section on line 4—4 of Fig. 2.
Figure 5:
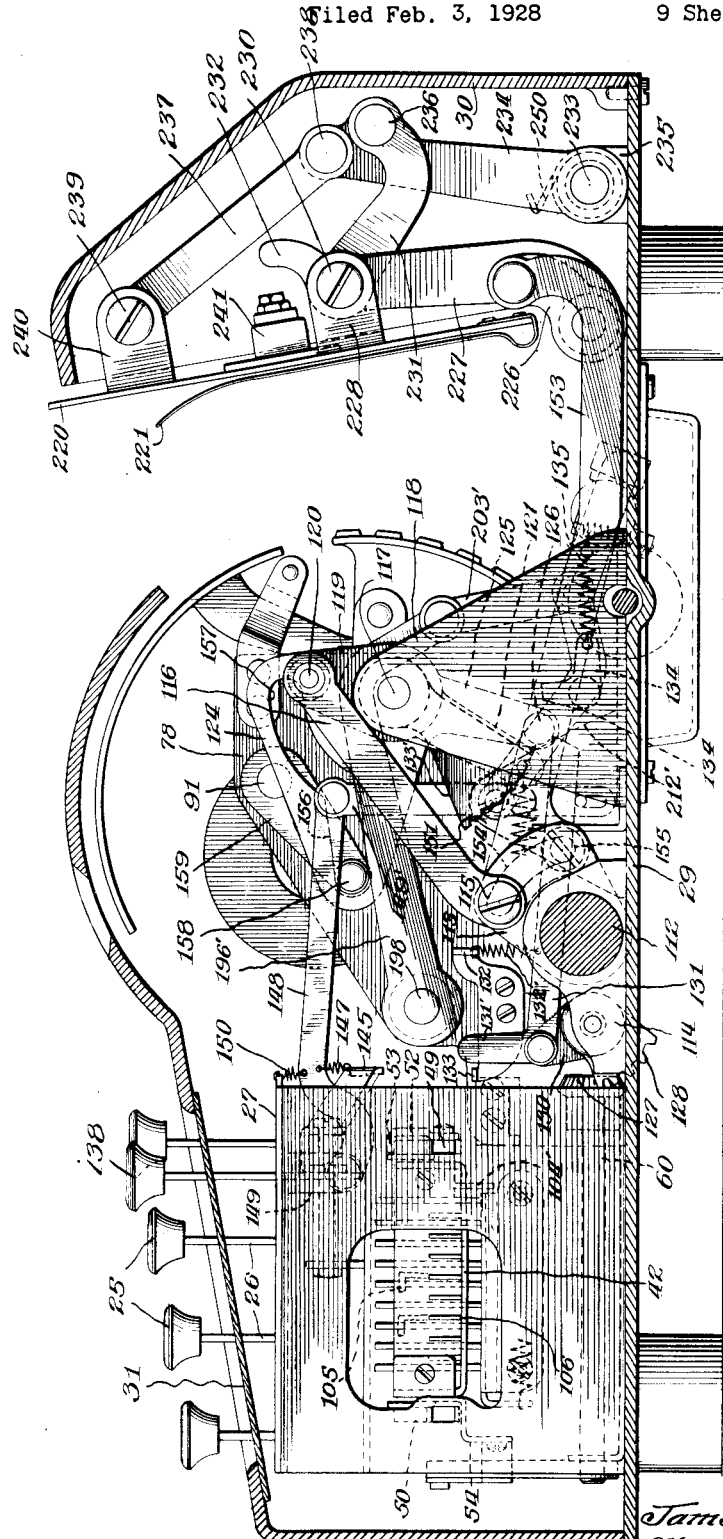
Fig. 5 is an elevation as viewed from the right of Fig. 1 with the side of the casing removed.
Figure 6:
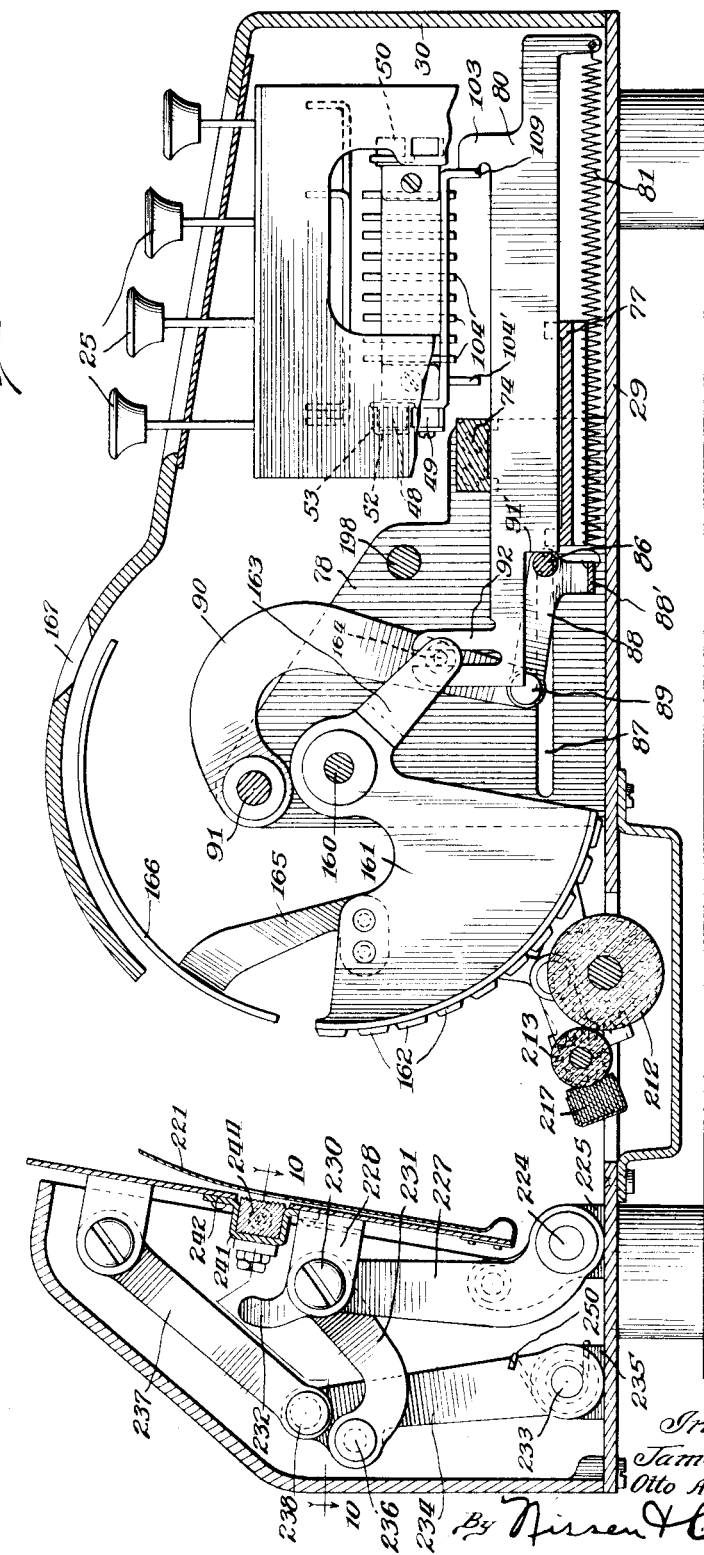
Fig. 6 is an elevation with parts in section showing the operating mechanism for the printing sectors and platen.

Mounted to slide across the front of the machine beneath the plate 38 is a stop carriage comprising a bottom plate 42, Figs. 5 and 6, having upwardly extending flanges 43 and 44, at its front and rear respectively, the flanges being connected by end plates 45 and 46. The side plate or flange 44, Fig. 4, extends beyond the end plate 46, as shown. Rollers 48 are journaled on the flange 44 and travel on a rail or a guide bar 49 (Figs. 2, 4, 5 and 6) and are supported on the side plates 28. A similar roller 50 is journaled on the side plate 43 and travels on a supporting rail 51.

A guard plate 52 is secured to the guide rail 49 and is provided with an overhanging flange 53, as shown in Figs. 2, 4 and 5, to prevent upward movement of the roller 48. A bracket 54, Figs. 2 and 5, is secured to the flange 43 and has a link 56 pivotally connected at 58 to an arm 59 fixed to the end of the shaft 60 extending longitudinally of the machine and journaled in bearings 61 mounted on the base 29. A spring 62 is secured to the arm 59 and to an ear 63 on the frame plate 28. The spring 62 normally tends to rotate the arm 59 in a counterclockwise direction, as viewed in Fig. 2 to move the stop carriage to the left in that figure. An escapement rack 64 is carried on the bracket 54 and is provided with teeth 65 for engaging a pair of escapement dogs 66 and 67 which control the movement of the carriage. The dog 67 is formed integral with an arm 68 which is pivotally supported at 69 on the carriage rail 51. The limber dog 66 is pivotally connected at 70 to the end of the arm 68. The arm 68 is connected by a link 400 to a bell crank 401 secured to a rod 402 journaled on bearing points carried by ears 404 on the plate 38. An arm 405 projects upwardly from the other end of the rod 402. A rod 406 is journaled in bearing points 407 and carries arms 408 at its opposite ends. Bars 409 connect the arms 408 with the bell crank 401 and arm 405, respectively, and cross rods 410.

Each key stem is provided with a laterally extending projection 26′, which limits the upward movement of the stems, and are provided on their lower edges, with inclined contact faces for engaging the parts 410. Whenever a key is depressed, the contacting part 410 will be moved to the left, rocking the bell crank lever 401 to move the link 400 and arm 68 downwardly to disengage the limber dog 66 from the rack teeth 65 and to bring the dog 67 into the path of the rack teeth. The escapement rack will move slightly to the left in Fig. 2 until the rack tooth is stopped by the dog 67. This will bring the end of the limber dog 66 beneath the tooth 65 so that, as the key is released and the escapement arm 68 moves upwardly, the dog 66 will be held down by the lower face of the tooth 65, expanding the spring 71. Upon releasing the key, the dog 67 moves out of the path of the tooth 65 under the influence of the spring 68′ and the rack 64, and the stop carriage connected therewith will be free to move to the left, as viewed in Fig. 2, under the influence of the spring 62, until the dog 66 clears the lower face of a tooth 65 and is drawn up between the teeth by the spring 71 to engage the next tooth 65.

A pair of guides 74 and 77, Fig. 6, secured to a pair of brackets 78 extending upwardly from the base 29, are arranged transversely of the machine and a series of slides 80 are guided in the guides 74 and 77. Each slide is provided with a spring 81 tending to draw it rearwardly, as best shown in Fig. 6. There is one slide provided for each decimal order of the numbers which may be set up in the machine. In the embodiment shown in the drawings, eight slides are shown but it will be understood that the number of slides will depend upon the capacity desired. The slides 80 are held in forward position, as shown in Fig. 6, against the tension of the spring by means of an abutment or cross bar 86 guided in slots 87 in each of the side plates 78. The slides 80 have downwardly extending stop shoulders 91′ which engage the cross bar 86 and hold the slides forwardly against the tension of the springs 81.

Each of the slides 80 is provided with an upwardly projecting lug 103 at the forward end of the slides for the engagement with stops 104 on the stop carriage. The stops 104 are guided in slots in the laterally bent flanges of plates 106 and the end portions of these plates extend into slots in the end plates 45 and 46 of the stop carriage, as shown in Fig. 5. The lower ends of the stops slide through slots in the bottom plate of the stop carriage and each stop is provided with a laterally projecting shoulder 107 between the flanges 105 and the bottom plate of the carriage to limit the vertical movement of the stops. Springs 108, Fig. 2, have one end of each pivoted to its corresponding stop and the other end pivoted to the supported plate so that the stop is held either in its uppermost or lowermost position after it has been moved past an intermediate dead center position. The stops 104 are arranged in rows, as shown in Fig. 4, the rows extending transversely of the machine being arranged to register with the fingers 37 controlled by respective number keys.

The foremost row of stops registers with the finger 37 operated by the zero key; the second row of stops registers with the finger connected with the number one digit key; the third row of stops registers with the finger connected with the number two digit key; and so on, to the last row of stops which registers with the finger of the number eight digit key. The number nine digit key is not provided with a finger 37 and there is no corresponding row of stops 104 provided but, instead, a continuous stop plate 104′ projects downwardly from the lower face of the carriage bottom plate 42. It will be seen from Figs. 4 and 6 of the drawings that the digit keys are arranged on the key board in three rows of three keys each and that the arms 34 are properly bent to bring the fingers of the respective digit keys in successive order from front to rear of the key board.

Figure 9:
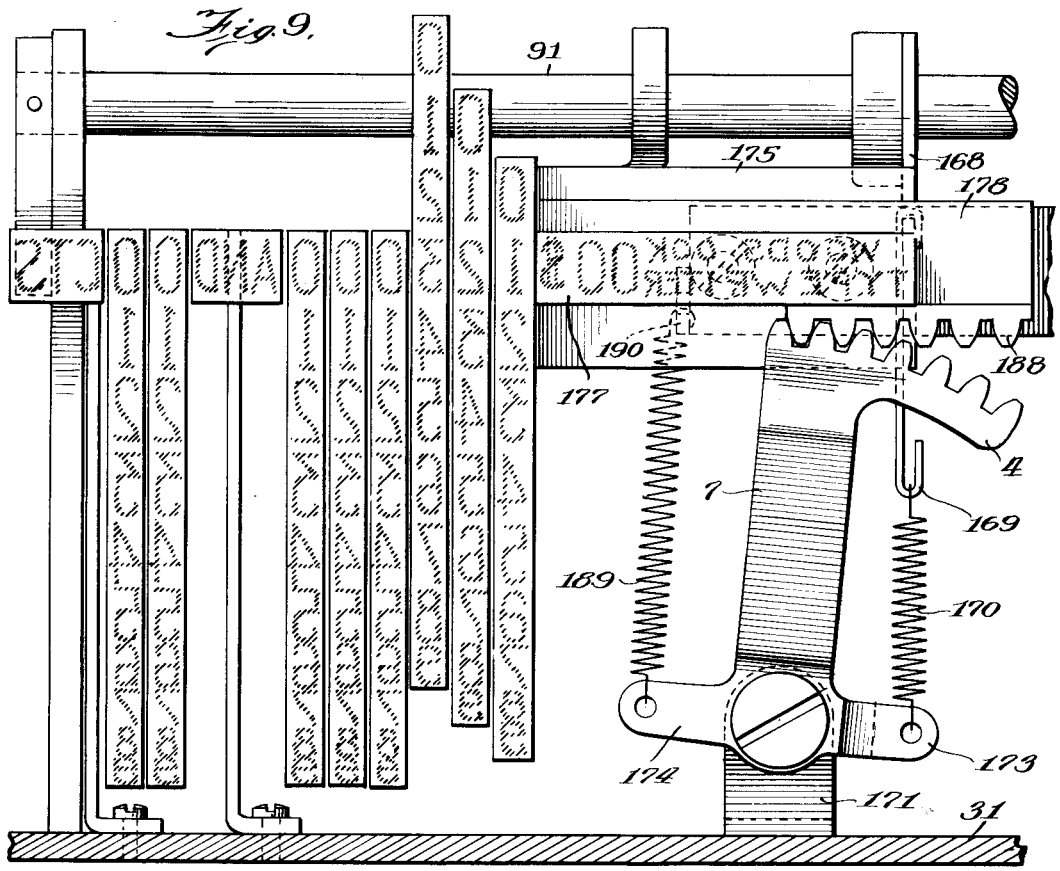
Fig. 9 is an elevation showing the ends of the type sectors and the operating mechanism for the type bar.

There are eight rows of stops, counting from left to right, in Figs. 2 and 4, and when the stop carriage is at its extreme right, as illustrated in these figures, the first row of stops at the left of the carriage will be directly beneath the rows of fingers 37. If one of the number keys is depressed, the correct stop in one row will be moved downwardly and the escapement mechanism will be operated to bring the depressed stop into registration with the projection 103 on the slide 80 at the extreme right of the series of slides, which is the slide corresponding to the units decimal order. If no other key is depressed and the handle is moved to operate the machine, in a manner to be described, the number corresponding to the depressed key will be set up in the units printing sector, Fig. 9, and will be printed in the units column, as will be more fully described. If the second key is depressed, it will depress a stop in the second row of the stop carriage and the escapement mechanism will be again operated to move the carriage another step to the left, bringing the first stop depressed into registration with the tens slide and the second stop depressed into registration with the units slide. It will be seen from Fig. 5 that the fingers are of different lengths, corresponding to the different lengths of the arms 34 so that the lower ends of the fingers will all move to the same level for a uniform depression of the keys 25. For each key depressed, the stop will be moved one step farther to the left. With a machine of the capacity shown in the drawings, numbers consisting of eight decimal orders may be thus set up. The tens and units decimal orders are printed as cents, as shown in Fig. 9.

If the number set up has fewer decimal orders than the number of slides, it is desirable to prevent forward movement of the slides in the path of which no stops are interposed. This result is secured by means of a plate 109 extending downwardly from the bracket 110 carried by the stop carriage. The plate 109 is parallel to the row of zero stops at the front of the machine and is spaced forward from these stops about the distance between the stops in the rows running longitudinally of the machine. The plate 109 prevents any movement of the slides to the left of the slide that positions the type for the highest decimal order to be printed.

The bar 86 has mounted on its ends the end members 88 of a frame which includes a downwardly extending portion on each member 88 connected by a cross bar 88'. The members 88 are each pivoted at 89 to the levers 90 fixed to a shaft 91 journaled in the plate 78.

The actuating mechanism may include any form of hand or mechanical power operating through the shaft 112 to the mechanism governing the operation of printing and inking. As shown, a crank 111 is fixed to the shaft 112 journaled in brackets 114 and 116', the shaft being reduced between the brackets, as shown in Fig. 1. The shaft 112 carries an arm 113 pivoted at 115 to a link 116. A shaft 117 is journaled at its ends in one of the brackets 78 and in a bracket 118. The shaft 117 carries an arm 119 pivoted at 120 to the link 116. A collar 122 is pinned to the shaft 117 and a spring 123 secured at one end to a stationary part of the machine has its other end fastened to a pin on the arm 121. A cam plate 124, Figs. 1 and 5, is fixed to the shaft 117 and the plate has a downwardly extending arm 125 carrying a roller 126. The shaft 60 has a gear 127 at one end which meshes with a gear 128 fixed on a shaft 129 journaled in the brackets 114 and 116'. An arm 130 is rigid with the shaft 129 and the arm 130 is pivoted to the carriage return bar 131. A bracket having projecting lugs 132 and 133 is attached to the plate 78, as shown in Figs. 1 and 5, and a spring 132' tending to draw the bar 131 upwardly into the path of the roller 126 is attached to the bar 131 and the lug 132.

The shaft 117 has a plate 133' fixed thereto and the edge of the plate is provided with ratchet teeth adapted to engage a pawl 134 pivoted on the bracket 118. A spring 135 is connected to a tail piece on the pawl 134, as shown in Figs. 1 and 5.

When the parts are at rest, that is, when the stop carriage is at the right of the machine, as viewed in Figs. 2 and 4, and no keys have been depressed, the roller 126 is positioned over the end of the bar 131, holding it down against the tension of the spring 132'. The plate 133' is positioned on the shaft 117 so that its ratchet teeth do not engage the pawl 134 until after some initial movement of the shaft 117 has taken place. When the crank 111 is turned, the shaft 117 is rotated against the tension of the spring 123 through the arm 113, link 116, and arm 119. The roller 126 on the arm 125 fixed to the shaft 117 is carried past the end of the bar 131 and the bar moves up in the path of the roller under the influence of the spring 132'. Upon continued rotation of the shaft 117, the ratchet teeth on the plate 133' engage the pawl 134 and the direction of rotation of the shaft 117 cannot be reversed until the plate 133' has moved sufficiently to clear the pawl 134 and this movement constitutes a complete forward movement of the crank.

The depression of the keys, in setting up the desired number, causes the part 131 to be moved to the right, Figs. 1 and 5, through the movement of the arm 130, shaft 129, and gears 128 and 127, caused by the rotation of the shaft 60 under the influence of the spring 62 acting on the arm 59. Upon the reverse movement of the shaft 117 under the influence of the spring 123, the roller 126 strikes the end of the bar 131, reversing the movement of the parts, and, through the gears 128 and 127, rotates the shaft 60 and arm 59 to return the stop carriage to its initial position, or to the right, as viewed in Fig. 2. The bar 131 has an arm 131' integral therewith that strikes the lug 133, Fig. 5, causing the bar 131 to move downwardly allowing the roller 126 to position itself in its initial position above the end of the bar 131.

The side plate 28, Fig. 2, has attached thereto a bracket 136 having an inclined end 137 adapted to contact with and raise the stops 104 when the carriage is returned to its initial position. The return movement imparted to the carriage by the return bar 131 moves the carriage to the right in Fig. 2 beyond the initial position of the carriage in order to raise all of the stops 104 through contact with the face 137 of the bracket 136. The carriage then moves to the left and is properly positioned by the first tooth on the rack 64 with the dog 66.

If an error has been made in depressing the keys, the stop carriage can be returned to initial position and the keys raised without going through with the printing operation. The arm 125 carrying the roller 126 and the plate 133' are so positioned on the shaft, as shown in Fig. 5, that the ratchet teeth on the plate 133' do not engage the pawl until the roller 126 has moved a slight but appreciable distance beyond the end of the bar 131. If there is error in depressing the keys, the crank 111 may be turned sufficiently to clear the end of the bar 131. The bar 131 will then move into the path of the roller 126 under the influence of the spring 132' and reversal of the movement of the crank will return the parts to initial position through the contact of the roller 126 with the end of the bar 131, as previously explained.

*Repeating mechanism*

The same number may be repeated a plurality of times without repeatedly inserting the number in the key board. The stop carriage with the proper stops depressed is permitted to remain in its inoperative position and the slides are operated as many times as it is desired to print the number. For this purpose, a repeat key 138 is provided having a shank portion 139 pivoted at 140 to an arm 141. The arm 141 is pivoted on a pin 142 mounted on a bracket 143 supported by the plate 28. The arm 141 is rigid with a sleeve portion 144 carrying an inwardly extending arm 145. The arm 145 is connected by a spring 147 to an arm 148 pivoted to a bracket 149 extending from the plate 27. A spring 150 fastened to a lug on the plate 27 and to the arm 148, holds the arm in raised position. The end of the arm 148 is pivoted to a link 149' carrying a roller 150 at its lower end. A pin in the bracket 151 is received in a slide in the end of the link 149, as shown in Fig. 5, and serves as a guide for the link. When the key 138 is depressed, the bar 143 is drawn down by the spring 147 and the roller 150 on the link 149 engages the top edge of the carriage return bar 131 holding it out of the path of the roller 126.

The shank 139 of the repeat key has a notch 152 to engage the plate 27 and hold the key down. When the bar 131 is held out of the path of the roller 126, the number set up on the key board may be printed as often as desired by simply operating the crank.

Type positioning mechanism

The cam plate 124 attached to the shaft 117 is provided with a straight slot 156 merging with a curved slot 157 concentric with the shaft 117. A part or roller 158 on an arm 159 fixed to the shaft 91 extends into the slot in the cam plate 124. The shaft 91 is journaled in the plate 78 and has fixed thereto an arm 90 disposed at each side of the slides 80 and between the plates 78, and the lower ends of the arms 90 are pivoted at 89 to the frame members 88. A shaft 160 is fixed in the plates 78 and pivoted on this shaft are type carrying members in the form of sectors 161, spaced by collars 162'. The sectors carry the type 162 at one end and an arm 163 projecting downwardly from the other side of the shaft 160 carries a pin 164 slidably engaging a slot in the upstanding end 92 of each of the slides 80. Each of the sectors carry an arm 165 supporting a sector 166 having numerals arranged thereon corresponding to the numerals on the type 162. When any particular type numeral is raised in position to be printed, the corresponding numeral on the sector 166 will be visible to the operator through the slot 167. For convenience, the shafts 91, 112 and 117 may be termed the driven shaft, the actuating shaft and the driving shaft, respectively.

Type plate

Figure 8:
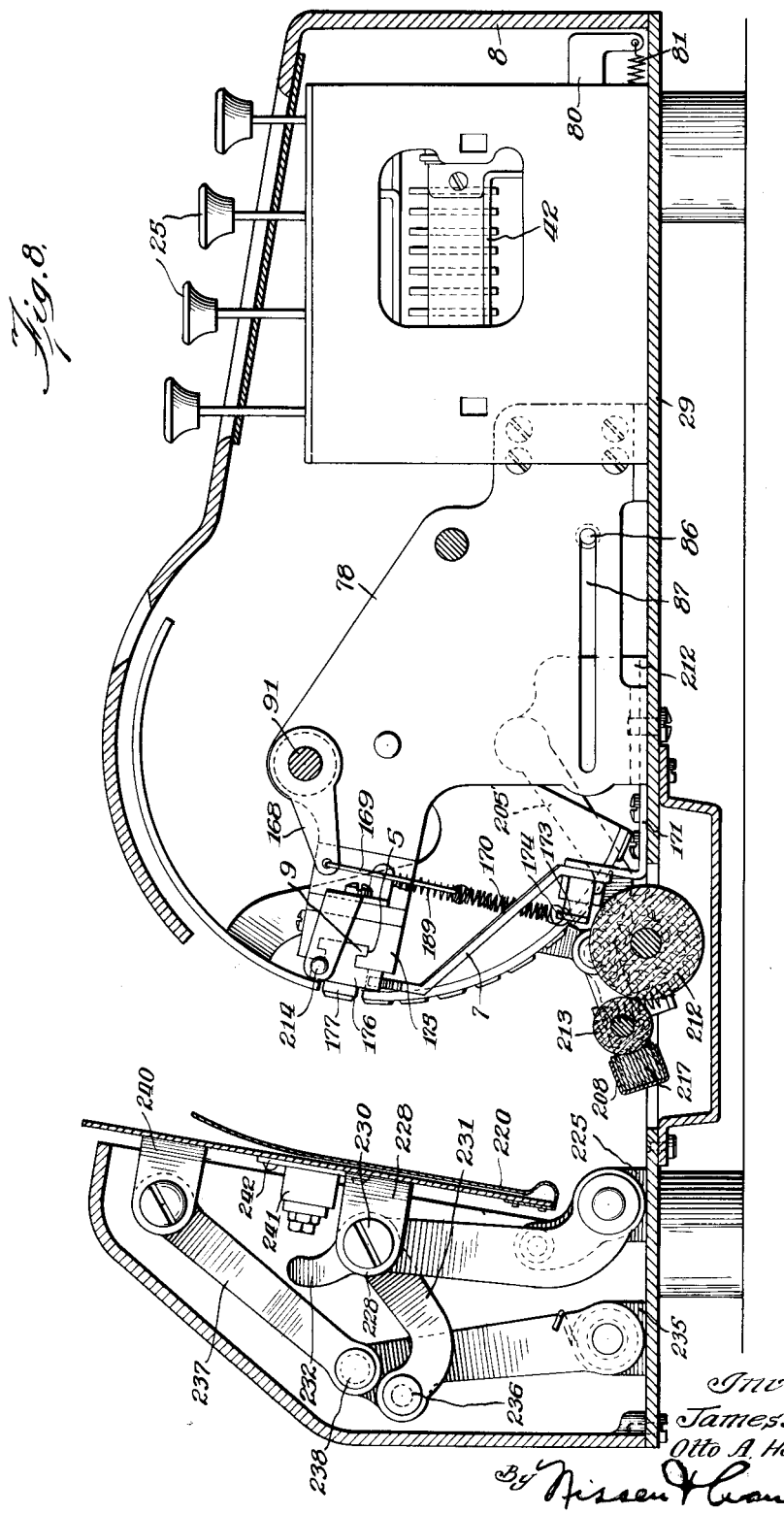
Fig. 8 is an elevation with parts removed and with parts in section, as viewed from the left of Fig. 1.

An arm 168 is fixed to the shaft 91 and carries a rod 169, Figs. 8 and 9, to which one end of the spring 170 is secured. To the bracket 171 mounted on the base 29, is pivoted an upwardly and rearwardly extending arm 7 having laterally extending ears 173 and 174. One of the side plates 78 has a laterally extending end 78' to which is secured a block 175 having longitudinally extending recesses in its rear face, the recess being enlarged by grooves 5, as shown in Figs. 1 and 8. A bar 176 is slidably received by the block 175 through the co-operation of the recesses 8 and lugs 9 of the bar 176 with the recess and grooves 5 of the block 175. The bar 176 carries a type plate 177 with groove cutting type and at its lower edge has a rack 188 which meshes with a gear segment 4 formed on the upper end of the arm 7. The end of the spring 170 is fastened to the ear 173 and the ear 174 has attached thereto one end of the spring 189, the other end being attached to a lug 190 on a bracket 191 secured to the arm 78' of the side plate 78. The spring 189 is considerably stronger than the spring 170 so that the bar 176 is normally held to the left of the type sectors. After the shaft 91 has rotated sufficiently to position the type sectors in printing position, the additional amount of rotation of the shaft 91 permitted by the spring 81 is allowed the cross bar 86 to move rearwardly after the projections 103 contact with their respective stops, has stretched the spring 170 enough to overcome the resistance of the spring 189 and the type plate 177 is moved to the left against the sector carrying the highest number to be printed. The purpose of the type plate is to prevent the check from being raised by the insertion of additional digits.

Inking mechanism

An arm 192 is fixed to the shaft 91 and is pivoted to a link 193, the edge of which bears on a roller 194 carried by an arm 195 secured to a bracket 93. A bell crank having arm 196 and 197 is fixed on one end of a shaft 198 and carries a pin 199 to ride in a slot 200 at the end of the link 193. The arm 196 is turned down, as shown at 201 in Fig. 7, and is pivoted at 202 to a link 203. The link 203 is pivoted at 204 to a link 205 which is pivotally supported at 206 by the bracket 93. The link 205 is mounted on the pivot 204 inside of the link 203 and the end member 207 of the inking pad support is pivoted on the opposite side of the link 203. The link 205 and the end member 207 have laterally extending lugs 209 and 210 connected by a spring 211. The shaft 198 has rigidly mounted on its opposite end a link 196', Figs. 1 and 5, pivoted to a link 203' which is pivoted to the opposite end 207' and to a link 205' in the same manner as the corresponding parts on the opposite side of the machine. The arm 205' is pivoted on the bracket 212' and carries a lug 209 connected with a similar lug 210' by a spring 211'. A pin 214 projects outwardly from the bracket 191 and a pin 215 projects from a bracket 216 mounted on the side plates 78. Inking rollers 212 and 213 are pivoted in brackets 2, as shown in Fig. 1, and the pivot of the large or feed roller 212 is extended to the outside of the machine and carries a knurled nut 216 for rotating the roller. The smaller or direct inking roller 213 contacts with the roller 212 and an inking pad 217 rests against the roller 213 when the pad is in its normal or lower position. A spring 218 tends to rotate the arm 196 downwardly to hold the ink pad in lower position. A spring 219 connecting the link 193 with the bracket 93 holds the offset portion of the slot against the pin 199. An opening is formed in the base 29 to accommodate the rollers and inking pad and the opening is covered by a plate which may be detached when it is desired to ink the feed roller 212.

Figure 7:
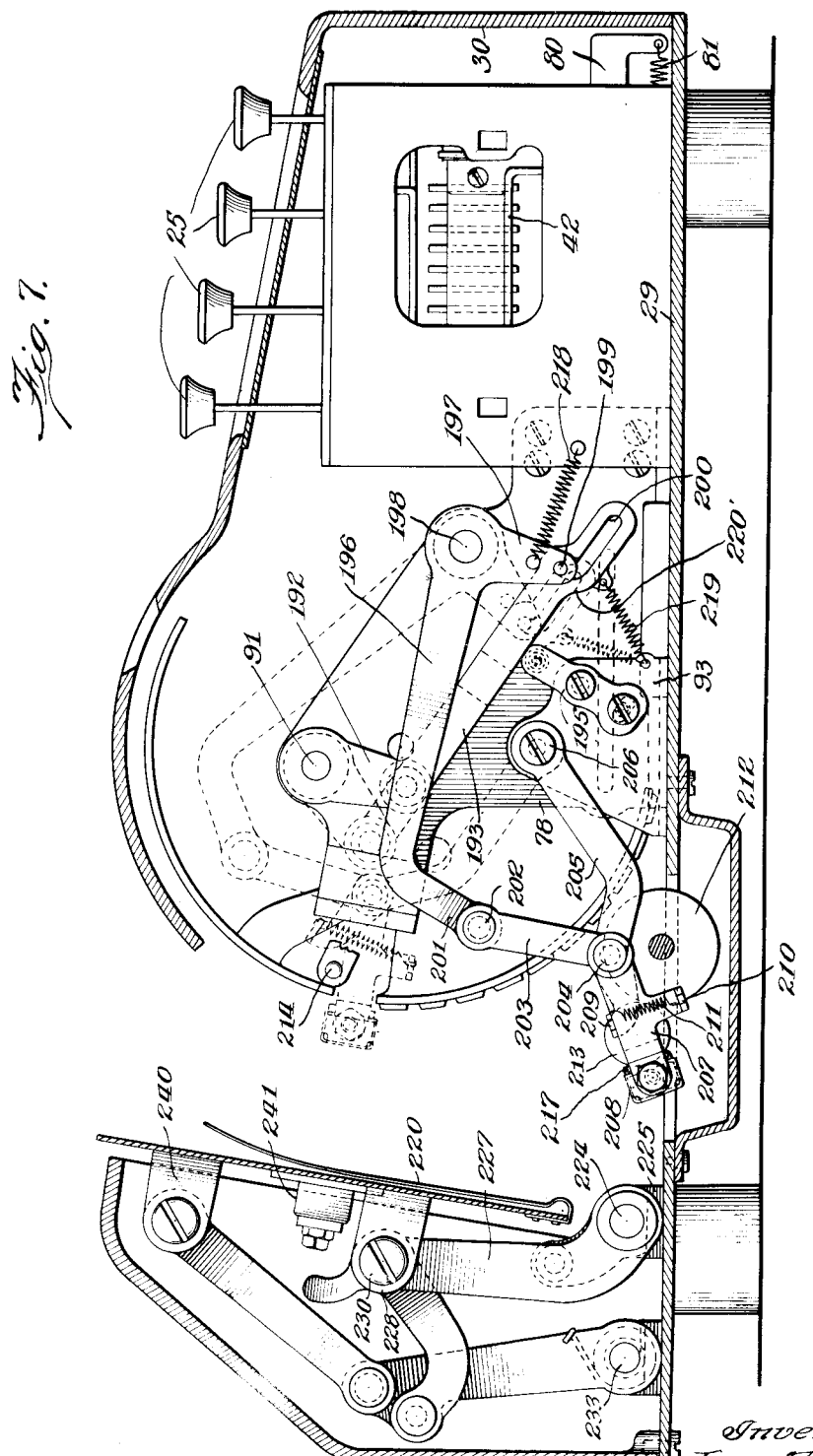
Fig. 7 is an elevation with the side casing removed, as viewed from the left of Fig. 1.

The clockwise rotation of the arm 192, Fig. 7, rotates the arms 196 and 196' against the tension of the spring 218 through the engagement of the pin 199 with the offset portion of the slot 200 in the link 193. The springs 211 and 211' hold the end members 207 and 207' against the lugs 209 and 209' on the links 205 and 205'. The links 205 and 205' carrying the end members 207 and 207' are rotated around their pivots by the connecting links 203 and 203' until the end members 207 and 207', held substantially radially to the sectors, strike the pins 214 and 215.

Considering only the side shown in Fig. 7, since the action at the other side of the machine is merely duplication, it will be seen that after the end member 207 strikes the pin 214, the link 205, as shown in dotted lines, continues to rotate about its pivot 206, holding the end member 207 against the pin 214 through the spring 211, the spring being stretched, of course, to permit the end of the arm 205 having the lug 209 to move away from the end member 207. The end member 207 can no longer rotate about its pivot 206 as a center after it strikes the pin 214 and will be drawn in against the type by the continued rotation of the link 205 and the pivot 204 about the pivot 206. As soon as the inking pad 217 has contacted with the type, the offset portion 220' of the link 193 contacts with the roller 194 carried by the arm 195 and lifts the slot 200 into registration with the pin 199. The spring 218 then rotates the link 196 in the reverse direction to lower the inking pad, the action taking place in exactly the same manner as when the parts are raised. The pin 199 slides to the right, Fig. 7, in the slot 200 as the link 196 rotates downwardly and as the link 205 rotates about the pivot 206, it moves the inking pad directly away from the type due to the fact that the spring 211 holds the member 207 against the spring 124 until the lug 209 contacts with the end member 207, whereupon the member 207 rotates with the link 205 around the pivot 206 until the pad 217 contacts with the roller 213. When the crank handle is moved in the opposite direction, which moves the link 193 to the right in Fig. 7, the spring 219 will reposition the pin 199 in the offset portion of the slot 200. It is to be noted that in this mechanism, the pad is kept spaced from the type until it is positioned in line with the type to be inked. The pad is then moved directly toward the type and it is moved directly away, thus keeping the ink from getting on adjacent type and avoiding any rubbing action between the pad and adjacent type.

*Platen mechanism*

Figure 10:
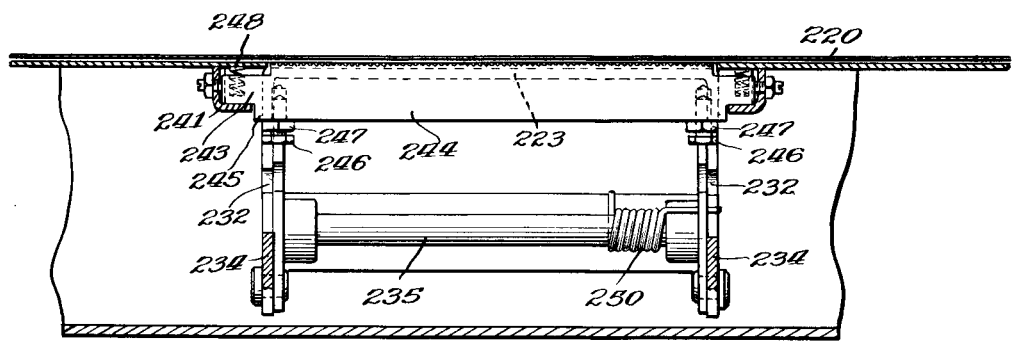
Fig. 10 is a section taken on the line 10—10 of Fig. 6.

The platen 220 is provided with a paper retaining clip 221 and has attached to its rear side brackets 222 and 223, as shown in Figs. 1 and 10. A shaft 224 journaled in the spaced bracket 225 carries an arm 226 pivoted to the link 153 and two spaced arms 227. The arms 227 carrying the tail pieces 232 are pivoted to ears 228 on the bracket 223 by the pivots 230 which also pivotally support the arms 231. A shaft 233 having arms 234 rigid with collars attached to the shaft is journaled in brackets 235 on the base 29 and is pivoted at 236 to the arms 231. A link 237 is pivoted at one end at 238 to each of the arms 234 and the upper ends of the links 237 are pivoted at 239 to the ears 240 on the bracket 222. The platen 220 is formed with an elongated slot which is covered by a housing 241 secured to the platen through the flanges 242. A bar 244 having a serrated or corrugated surface is slidably mounted in the housing through the reduced end portions 243 which permit the bar to move laterally through the open sides of the housing, as shown in Fig. 10. The bar 244 has portions 245 projecting beyond the housing and studs 246 positioned in the path of the tail pieces 232 are threaded into the bar 244. The studs are provided with lock nuts 247 and springs 248 are interposed between the platen and the bar to hold the bar away from the paper. The linkage 227, 237, 234, and 231, constitutes a parallel motion mechanism which moves the platen, through the link 153, normal to the type. As the platen moves toward the type, the links 227 rotate with the bar 224 at their lower ends and the tail pieces 232 on the arms 227 move toward the bar 244 contacting with the nuts 246, thereby compressing the paper between the serrations on the type and the bar 244.

The end of the link opposite the platen operating mechanism is formed with a portion having an arcuate slot 154 concentric with the crank shaft axis. The arm 113 on the crank shaft carries a pin 155 received in the lower end of the slot 154 to actuate the link 153 after the crank has turned in its forward movement counterclockwise in Figs. 1 and 5, an amount sufficient to bring the pin 155 on the arm 113 in contact with the upper end of the slot 154 in the arms.

*Operation*

When the keys have been depressed, the stops and carriage are positioned as previously explained. The crank is then turned toward the operator and the arm 113, link 116, and arm 119 rotates the shaft 117 counterclockwise, as viewed in Figs. 1 and 5. Rotation of the cam plate 124, Fig. 5, on the shaft 117 rotates the shaft 91 by reason of the engagement of the roller 158 with the straight portion of the slot in the cam plate. The arms 90 secured to the shaft 91 move the cross shaft 86, Fig. 6, rearwardly in the slots 87, permitting the slides 80 to move rearwardly under the influence of the springs 81 until the projections 102 on the slides 80 engage the respective stops interposed by the keys. The rearward movement of the slides 80 rotates the sectors 61 through the engagement of the pins 164 on the arms 163 of the sectors with the slots in the upstanding portions 92 of the slides. The rotation of the sectors 161 depends, of course, upon the distance traversed by the slides 80 before they are arrested by their respective stops and, consequently, the type on each sector corresponding to the key depressed is raised to printing position and the type to be printed is alined with the bar 244 of the platen when the platen is moved forward to bring the paper against the type.

While the shaft 91 is rotating to position the type, the arm 192, Fig. 7, on the shaft 91 is raising the inking pad 217 through the link 193 and after the type has been positioned, the type plate 177 is moved against the sector bearing the highest decimal order, as previously explained. Immediately after the type has been positioned, it is inked by the inward movement of the pad, after which the pad is returned to its lowered position. The shaft 91 is rotated to position the type and actuate the inking mechanism only during the engagement of the roller 158 with the straight portion of the slot in the cam plate. The shaft 91 is stationary during the remaining stroke of the crank because of the engagement of the roller 158 with the curved portion of the slot concentric with the drive shaft 117.

When the roller 158 has reached the curved portion of the slot, the pin 155 on the arm 113 of the crank shaft 112 has reached the end of the slot in the arm 115 and the check held by the platen is drawn against the type and squeezed between the corrugated type and the bar 244. When the crank is moved in reverse direction, the platen is drawn rearwardly by the spring 250 and the roller 126 on the arm 125 attached to the shaft 117 through the cam plate 124, contacts with the bar 131 to return the carriage and stops to initial position, as previously explained. During the return of the platen and carriage, the roller 158 engages the curved part of the slot in the cam plate 124, and shaft 91, arms 90, slides 80, and type sectors 161 remain stationary. When the platen and carriage are returned to initial position, the roller 158 has reached the straight portion of the slot in the cam plate and the shaft 91 is rotated to return the slides 80 and sectors 161 to initial position through the engagement of the frame members 88 with the shoulders 91' on the slides 80.

We claim:—

1. A check writer comprising, in combination, actuating mechanism, key controlled type carrying members movable into selected printing position by said mechanism, grooved type on said members, a substantially flat platen having a support comprising elements arranged to impart parallel motion to said platen, said platen being movable by said mechanism toward said type and being adapted to carry the material on which the printing is to be made.

2. A check writer comprising, in combination, actuating mechanism, type carrying members movable into selected printing position by said mechanism, grooved type on said members, a platen adapted to hold a check, pivoted elements supporting said platen and connected to said mechanism for movement toward and away from said type, a corrugated bar, and means operated by the movement of said pivoted elements during the movement of said platen toward said type to press said bar against the check when the check contacts with said type.

3. In a check writer having actuating mechanism, type selecting means, and type carrying members movable into selected printing position by said mechanism, an ink carrier therefor and having supporting means to move said ink carrier from initial position in a path spaced from the type on said members, said supporting means being operable by means which constrains said ink carrier to move in a substantially straight line toward said type selected for printing when said carrier has reached a position in said path in substantial alinement with said selected type, said supporting means thereafter being actuated by means which constrains it to move in substantially a straight line away from said selected type and to its initial position in a path spaced from the type on said members.

4. In a check writer having actuating mechanism, type selecting means, and type carrying members movable into selected printing position by said mechanism, an ink carrier having supporting means to move said ink carrier from initial position in a path spaced from the type on said members, said supporting means being operable by means which constrains said ink carrier to move in a substantially straight line toward said type selected for printing when said carrier has reached a position in said path in substantial alinement with said selected type, said carrier being movable by means independent of said mechanism in substantially a straight line away from said selected type and to initial position in a path spaced from the type on said members.

5. In a check writer having actuating mechanism, type selecting means, and type carrying members movable into selected printing position by said mechanism, an ink carrier movable by said mechanism and having a supporting structure constraining said ink carrier to move from initial position in a path spaced from the type on said members, means operable, when said ink carrier is adjacent said type selected for printing, for constraining said ink carrier to move in a substantially straight line toward said selected type, said ink carrier being constrained by said last-mentioned means to move in substantially a straight line away from said selected type and to initial position in a path spaced from the type on said members.

6. In a check writer having actuating mechanism, type selecting means, and type carrying members movable into selected printing position by said mechanism, an ink carrier movable by said mechanism and having a supporting structure constraining said ink carrier to move from initial position in a path spaced from the type on said members, means operable, when said ink carrier is adjacent said type selected for printing, for constraining said ink carrier to move in a substantially straight line toward said selected type, said ink carrier being constrained by said last-mentioned means and moved by means independent of said mechanism in substantially a straight line away from said selected type and to initial position in a path spaced from the type on said members.

7. In a check writer having actuating mechanism, type selecting means, and type carrying members movable into selected printing position by said mechanism, an inking mechanism carrying an inking pad and operatively connected to said actuating mechanism to move said pad from initial position in a path spaced from the type on said members, said inking mechanism being constrained to move said pad in a substantially straight line toward said type selected for printing when said carrier has reached a position in said path in substantial alinement to said selected type, a tripping mechanism to disengage said inking mechanism from said actuating mechanism, and a spring operative to return from said inking mechanism and pad to initial position.

8. In a check writer having actuating mechanism, type selecting means, and type carrying members movable into selected printing position by said mechanism, a pivoted bell crank lever having a pin on one arm and a link pivoted to the other arm, a second link pivotally mounted and pivoted to said first link, an inking pad supported on a frame member pivotally carried by said links, a spring connecting said member and second link, a link having a slot with an offset portion engaging said pin, said slotted link being pivotally connected to a crank operated by said mechanism, a stop member mounted in the path of movement of said member, a stop member positioned to engage the slotted end of said link to release said pin from the offset portion of said slot, and a spring tending to rotate said bell crank to move said inking pad away from type to inoperative position.

9. In a check writer having actuating mechanism, type selecting means, and type carrying members movable from initial position into selected printing positions by said mechanism, an ink carrier automatically movable to and from initial position in a path spaced from the type on said members, means constraining said ink carrier to move in a substantially straight line toward the type selected for printing when said carrier has reached a position in said path in substantial alinement with said selected type, and means constraining said carrier to move in substantially a straight line away from said type before moving in said path to initial position.

10. In a check writer having actuating mechanism, type selecting means, and type carrying members movable from initial position into selected printing positions by said mechanism, an ink carrier therefor and having means to automatically move said carrier to and from initial position in a path spaced from the type on said members, means constraining said ink carrier to move in a substantially straight line toward the type selected for printing when said carrier has reached a position in said path in substantial alinement with said selected type, means constraining said carrier to move said carrier in substantially a straight line away from said type before moving in said path to initial position, and a platen having a connection with said mechanism operative to move said platen toward and away from said type after said ink carrier has moved to initial position but before said type carrying members are returned to initial position by said mechanism.

11. A check writer comprising, in combination, actuating mechanism, type carrying members having corrugated type and representing different decimal orders, slides connected to each of said members, spring means tending to move each of said slides, said slides and members being connected so that definite distances traversed by each of said slides correspond to different type digits on each of said members moved into printing position by the motion imparted to said members by said slides, an abutment holding said slides from movement against the action of said spring means, said abutment being movable by said mechanism to permit said slides to move under the action of said spring means, operating keys and type selecting means comprising stops adapted to engage projections on said slides after they have moved distances corresponding to the digits to be printed, said operating keys having projections thereon for directly engaging and selectively operating said stops.

12. A check writer comprising, in combination, actuating mechanism, pivotally mounted curved type carrying members representing different decimal orders, each of said members having corrugated type secured at its periphery, slides connected to each of said members, spring means tending to move each of said slides, said slides and members being connected so that definite distances traversed by each of said slides correspond to different type digits on each of said members rotated into printing position by the rotative movement imparted to said members by said slides, an abutment holding said slides from movement against the action of said spring means, said abutment being movable by said mechanism to permit said slides to move under the action of said springs, digit keys and type selecting means adapted to stop said slides after they have moved distances corresponding to the digits to be printed, said type selecting means comprising a plurality of stops directly actuated by projections on said digit keys.

13. A check writer comprising, in combination, actuating mechanism, pivotally mounted sectors representing different decimal orders, each of said sectors carrying corrugated type, an arm having a pin thereon extending from each of said sectors, slides each having a slot in one end for receiving said pins, said sectors and slides being related so that definite distances traversed by each of said slides correspond to different type digits on each of said digits rotated into printing position by said slides, spring means tending to move said slides, an abutment for normally holding said slides from movement against the action of said spring means, said abutment being movable to inoperative position and type selecting means adapted to interpose stop members in the path of said projections to stop said slides after they have moved distances corresponding to the digits to be printed when said abutment has been moved to inoperative position.

14. A check writer comprising, in combination, an actuating shaft, and a driving shaft, an arm on each of said shafts, a link pivoted to each of said arms, a cam plate rigid with said driving shaft, said cam plate having a slot therein a portion of which is concentric with said drive shaft, a driven shaft, an arm on said driven shaft carrying a part projecting into said slot, an abutment carried by said driven shaft, type carrying members movable to position the type thereon in printing position, spring urged slides connected to said members and normally held stationary by said abutment, said abutment being released as said driving shaft actuates said driven shaft type selecting means operable to stop the movement of said slides after they have traversed distances corresponding to the type to be printed, a platen, and a link operatively connected to said platen and having a lost motion connection at its other end with said drive shaft arm, said lost motion connection being effective to move said platen when said part projects into said concentric portion of said slot.

15. A check writer comprising, in combination, an actuating shaft and a driving shaft, an arm on each of said shafts, a link pivoted to each of said arms, a cam plate and a carriage return arm rigid with said driving shaft, said cam plate having a slot therein a portion of which is concentric with said drive shaft and another portion of which is not concentric, a driven shaft, an arm on said driven shaft carrying a part projecting into said slot, an abutment carried by said driven shaft, type carrying members movable to position the type thereon in printing position, spring urged slides connected to said members and normally held stationary by said abutments, a stop carriage having keys operable to move said carriage and interpose stops to stop the movement of said slides after they have traversed distances corresponding to the type to be printed, said abutment being moved to inoperative position when said part engages the non-concentric portion of said slot to thereby permit the slides to engage said stops, a platen, a link operatively connected to said platen and having a lost motion connection at its other end with said drive shaft arm, said lost motion connection being effective to move said platen when said part projects into said concentric portion of said slot, and a carriage return bar adapted to be interposed in the path of said carriage return arm to return said carriage to initial position.

16. A check writer comprising, in combination, members representing different decimal orders and provided with corrugated type, actuating mechanism for moving said members to position the type for printing, a stop carriage having stops thereon, and keys operable to depress desired stops and to move said carriage and place said stops into positions limiting the movement of desired ones of said members, a carriage return bar movable in one direction by said carriage and movable in the opposite direction to return said carriage and stops to initial position, a carriage return arm normally positioned above said bar, means urging said bar into the path of said arm when said arm has been moved by said mechanism past the end of said bar, and a non-reversing means for said mechanism operative after said arm has moved past the end of said bar.

17. A check writer comprising a plurality of type bars, one type bar being provided for each decimal order within the capacity of the check writer and each type bar being provided with a plurality of type, slides operatively connected to said type bars, yielding means tending to move said slides in one direction, means for holding said slides against the action of the yielding means, a carriage, a plurality of rows of stops on said carriage, means for selectively moving a stop in each row into operative position, means for moving the carriage to position the stops in the path of movement of co-operating stop members on said slides which are to be used, and means for releasing the slides to permit them to move toward and engage the stops on said carriage to thereby position the desired type on said type bars in proper alinement.

18. A device as claimed in claim 17 in which a type plate is movable into a position adjacent the type bar which indicates the highest decimal order which is to be printed.

19. A device as claimed in claim 17 in which means is provided for preventing movement of the slides which are not to be used.

20. A check writing apparatus comprising in combination an actuating mechanism, type carrying members movable into selected printing positions by said mechanism, type on said members, a platen adapted to hold a check, pivoted elements supporting said platen and connected to said mechanism for movement toward and away from said type, a pressure bar, and means operated by the movement of said pivoted elements during the movement of said platen towards said type to press said bar against a check and consequently the check against the type when the check moves into engagement with said type.

21. A check writer comprising a plurality of type movable to selected printing position, a platen for carrying the check upon which the type is to be printed, said platen comprising a plate having an opening therein, means for holding a check against the surface of said plate and over said opening, means for moving said plate in a direction towards said type, a check protecting bar mounted in said opening and normally yieldingly held below the supporting surface of said plate, and means for moving said bar so that it projects above said surface when said platen is moved to such a position that the check is engaged by said type.

22. A check writing apparatus comprising a plurality of type adapted to be alined in proper position to be printed, a platen for carrying the material upon which the type are to be printed, arms movably mounted so as to carry said platen through successive substantially parallel planes towards the type, a check protecting bar mounted in an opening in said platen, and means operable by the movement of said arms in carrying said platen towards said type for moving said check protecting bar above the supporting surface of said platen and against the material on said platen when said material is adjacent said type.

23. A check writer comprising, in combination, actuating mechanism, type carrying members having type and representing different decimal orders, slides connected to each of said members, spring means tending to move each of said slides, said slides and members being connected so that definite distances traversed by each of said slides correspond to different type digits on each of said members moved into printing position by the motion imparted to said members by said slides, an abutment holding said slides from movement against the action of said spring means, said abutment being movable by said mechanism to permit said slides to move under the action of said spring means, operating keys, and type selecting means comprising stops adapted to engage projections on said slides after they have moved distances corresponding to the digits to be printed, said operating keys having projections thereon for directly engaging and selectively operating said stops.

24. A check writer comprising, in combination, actuating mechanism, type carrying members having type and representing different decimal orders, slides connected to each of said members, spring means tending to move each of said slides, said slides and members being connected so that definite distances traversed by each of said slides correspond to different type digits on each of said members moved into printing position by the motion imparted to said members by said slides, an abutment holding said slides from movement against the action of said spring means, said abutment being movable by said mechanism to permit said slides to move under the action of said spring means, operating keys, and type selecting means comprising stops adapted to engage projections on said slides after they have moved distances corresponding to the digits to be printed, said operating keys having projections thereon for directly engaging and selectively operating said stops, said abutment being adapted to move said slides into initial position after the printing operation.

25. A check writer comprising, in combination, actuating mechanism, pivotally mounted curved type carrying members representing different decimal orders, each of said members having type secured at its periphery, slides connected to each of said members, spring means tending to move each of said slides, said slides and members being connected so that definite distances traversed by each of said slides correspond to different type digits on each of said members rotated into printing position by the rotative movement imparted to said members by said slides, an abutment holding said slides from movement against the action of said spring means, said abutment being movable by said mechanism to permit said slides to move under the action of said springs, digit keys, and type selecting means adapted to stop said slides after they have moved distances corresponding to the digits to the printed, said type selecting means comprising a plurality of stops directly actuated by projections on said digit keys.

26. A check writer comprising, in combination, actuating mechanism, pivotally mounted sectors representing different decimal orders, each of said sectors carrying type, an arm having a pin thereon extending from each of said sectors, said slides each having a slot in one end for receiving said pins, said sectors and slides being related so that definite distances traversed by each of said slides correspond to different type digits on each of said digits rotated into printing position by said slides, spring means tending to move said slides, an abutment for manually holding said slides from movement against the action of said spring means, said abutment being movable to inoperative position, and type selecting means adapted to interpose stop members in the path of said projections to stop said slides after they have moved distances corresponding to the digits to be printed when said abutment has been moved to inoperative position.

27. A check writer comprising, in combination, an actuating shaft and a driving shaft, an arm on each of said shafts, a link pivoted to each of said arms, a cam plate and a carriage return arm rigid with said driving shaft, said cam plate having a slot therein a portion of which is concentric with said drive shaft and another portion of which is not concentric, a driven shaft, an arm on said driven shaft carrying a part projecting into said slot, an abutment carried by said driven shaft, type carrying members movable to position the type thereon in printing position, spring urged slides connected to said members and normally held stationary by said abutments, a stop carriage having keys operable to move said carriage and interpose stops to stop the movement of said slides after they have traversed distances corresponding to the type to be printed, said abutment being moved to inoperative position when said part engages the non-concentric portion of said slot to thereby permit the slides to engage said stops, a platen, a link operatively connected to said platen and having a lost motion connection at its other end with said drive shaft arm, said lost motion connection being effective to move said platen when said part projects into said concentric portion of said slot, a carriage return bar adapted to be interposed in the path of said carriage return arm to return said carriage to initial position, and means for preventing the operation of said carriage return arm so that said stops will remain as set to thereby permit the same type to be printed again without the necessity of re-setting the stops.

28. A device as claimed in claim 15 in which said stops are moved to inoperative position as said carriage is returned to its initial position by said carriage return arm.

29. A check writing apparatus comprising a platen for holding a check to be printed, type bars carrying type adapted to be selectively moved into printing position, slides for said type bars adapted to move said type bars to position the desired type in printing position, an abutment for normally preventing movement of said slides in a direction to operate said type bar, springs attached to said abutment and said slides, means for moving said abutment out of the position where it prevents movement of said slides to permit said springs to actuate said slides, the movement of said abutment away from said position causing the tension in said springs to be increased, stop members for limiting the amount of movement of said slides under the influence of said springs, and means for moving said platen and type bars relative to each other to print the type on a piece of material held on said platen.

30. A check writer comprising a plurality of type bars, a plurality of stops, slides for actuating said type bars and controlled by the position of said stops, means for selecting the stops for said slides, an abutment for normally preventing movement of said slide to actuate said type bars, means normally tending to actuate said slides, means for moving said abutment out of operative position to permit said slides to move until arrested by said stops, inking mechanism for inking the type to be printed and operable after the desired type have been arranged in printing position, means for removing the inking mechanism before the type is printed, a platen, means for moving said platen towards the type to be printed, means for re-setting the type bars, slides, stops and platen in a position for the next printing operation, and means selectively operable for preventing the operation of the stop re-setting mechanism to thereby permit the same type to be printed as many times as desired without re-setting the stops.

31. A check writer comprising a rotatably mounted digit carrying sector, a slidable carriage for moving said sector to printing position, a vertically mounted depressible key controlling the operation of said carriage, means movable in an arc for inking a digit which is moved to printing position, check supporting means, a platen carried by said check supporting means, and means for moving the platen toward the digit to be printed.

32. A check writer comprising a rotatably mounted digit carrying sector, a slidable carriage for moving said sector to printing position, a vertically mounted depressible key controlling the operation of said carriage, means movable in an arc for inking a digit which is moved to printing position, check supporting means, a platen carried by said check supporting means, and means for operating the inking means and moving the platen to printing position, said inking means operating in advance of the platen.

33. A check writer comprising a rotatably mounted digit carrying sector, a slidable carriage for moving said sector to printing position, a vertically mounted depressible key controlling the operation of said carriage, means movable in an arc for inking a digit which is moved to printing position, check supporting means, a platen carried by said check supporting means, said inking means being interposed between the platen and the digit to be printed, and means simultaneously operating the printing means and moving the platen to printing position, said inking means operating in advance of the platen to ink the digit to be printed prior to printing engagement of the platen with the digit.

34. A check writer comprising a plurality of oscillatory mounted digit carrying sectors, a slidable carriage for moving said sectors to printing position, vertically mounted depressible keys controlling the operation of said carriage for selectively bringing the digits on said sectors to printing position, inking means movable in an arc and spaced a predetermined distance from said sectors during movement thereof, means limiting the arcuate movement of said ink carrying means at a point opposite the printing position of said digits, means for moving the inking means toward the sectors at the end of the arcuate movement of the inking means, a check holder, a platen carried by the holder, and means for bringing the platen into printing engagement with the digits after the inking of said digits which are in printing position.

35. A check writer comprising a plurality of oscillatory mounted digit carrying sectors, a slidable carriage for moving said sectors to printing position, vertically mounted depressible keys controlling the operation of said carriage for selectively bringing the digits on said sectors to printing position, inking means movable in an arc and spaced a predetermined distance from said sectors during movement thereof, means limiting the arcuate movement of said ink carrying means at a point opposite the printing position of said digits, means for moving the inking means toward the sectors at the end of the arcuate movement of the inking means, a check holder, a platen carried by the holder, means for bringing the platen into printing engagement with the digits after the inking of said digits which are in printing position, and instrumentality for holding the sectors in printing position.

36. A check writer comprising a plurality of oscillatory mounted digit carrying sectors, a slidable carriage for moving said sectors to printing position, vertically mounted depressible keys controlling the operation of said carriage for selectively bringing the digits on said sectors to printing position, inking means movable in an arc and spaced a predetermined distance from said sectors during movement thereof, means limiting the arcuate movement of said ink carrying means at a point opposite the printing position of said digits, means for moving the inking means toward the sectors at the end of the arcuate movement of the inking means, a check holder, a platen carried by the holder, means for bringing the platen into printing engagement with the digits after the inking of said digits which are in printing position, and means for releasing the sectors from printing position prior to printing impression.

37. A check writer comprising a plurality of oscillatory mounted digit carrying sectors, a slidable carriage for moving said sectors to printing position, vertically mounted depressible keys controlling the operation of said carriage for selectively bringing the digits on said sectors to printing position, inking means movable in an arc and spaced a predetermined distance from said sectors during movement thereof, means limiting the arcuate movement of said ink carrying means at a point opposite the printing position of said digits, means for moving the inking means toward the sectors at the end of the arcuate movement of the inking means, a check holder, a platen carried by the holder, means for bringing the platen into printing engagement with the digits after the inking of said digits which are in printing position, means for holding the sectors in printing position, and repeating means for causing duplication of any digit on any sector by duplicate depression of a key.

38. A check writer comprising a plurality of oscillatory mounted digit carrying sectors, a slidable carriage for moving said sectors to printing position, vertically mounted depressible keys controlling the operation of said carriage for selectively bringing the digits on said sectors to printing position, inking means movable in an arc and spaced a predetermined distance from said sectors during movement thereof, means limiting the arcuate movement of said ink carrying means at a point opposite the printing position of said digits, means for moving the inking means toward the sectors at the end of the arcuate movement of the inking means, a check holder, a platen carried by the holder, means for bringing the platen into printing engagement with the digits after the inking of said digits which are in printing position, means for holding the sectors in printing position, repeating means for causing duplication of any digit on any sector by duplicate depression of a key, means for holding the sectors in printing position, and means for releasing all of said sectors from printing position prior to printing impression.

39. A check writer comprising a plurality of spaced pivotally mounted digit carrying sectors, means for moving the sectors in a vertical arc to printing position in a predetermined manner, and a single key moving any sector to printing position according to a predetermined sequence, a platen, means for moving the platen into printing impression position relative to said sectors, and inking means operating in advance of the printing impression.

JAMES F. KOCA.
OTTO A. HOKANSON.